2,715,061

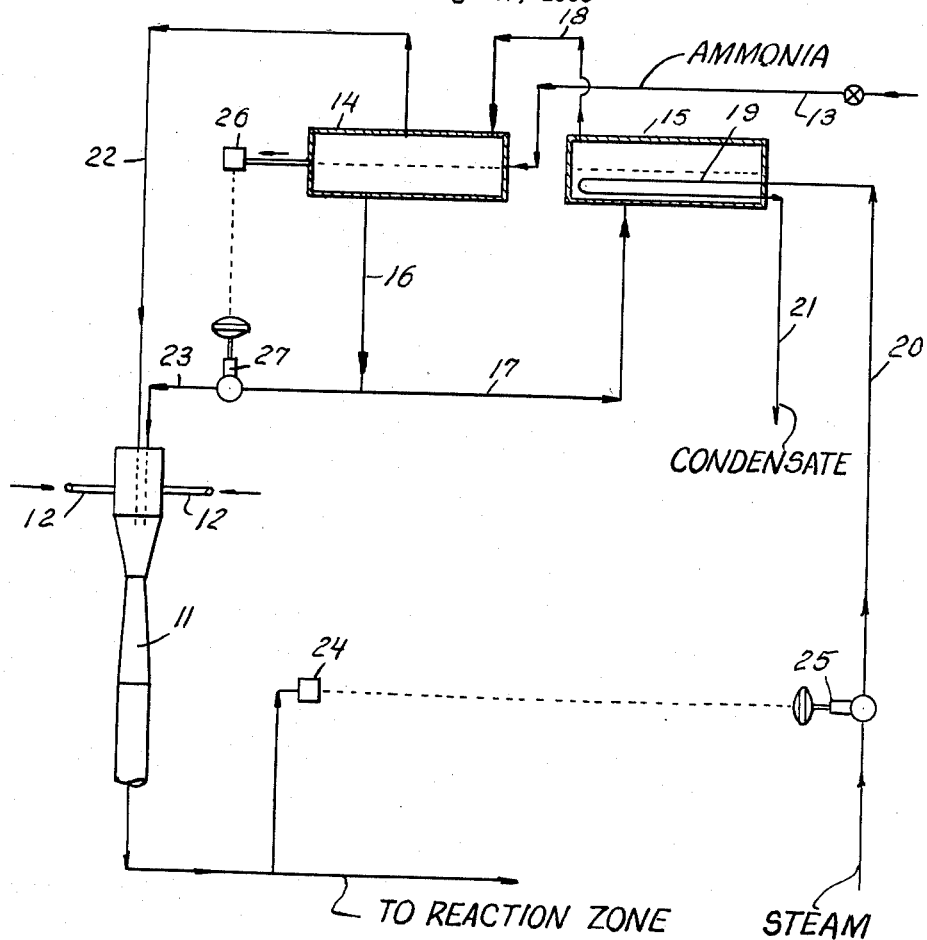

HYDRAZINE REACTOR SYSTEM

Bernard H. Nicolaisen and James N. Felger, Kenmore, N. Y., assignors to Olin Mathieson Chemical Corporation, a corporation of Virginia Application August 18, 1953, Serial No. 374,896

1 Claim. (Cl. 23—260)

Our invention relates to improvements in the manufacture of hydrazine by the Raschig process. More particularly, our invention provides an apparatus or system for controlling the ratio of gaseous ammonia to liquid ammonia admixed with aqueous chloroamine solution in the second step of the synthesis. Our system makes possible improved temperature control.

In one commercial method for the manufacture of hydrazine, an aqueous solution of chloroamine is prepared, preferably at about −5 to +5° C., and as quickly as possible is admixed with a great excess of ammonia, preferably from about 30 to 50 moles per mole of chloroamine. At the same time, it is advantageous to raise the temperature of the mixture as rapidly as possible to about 125 to 155° C. and to maintain it at this temperature under a pressure of about 300 to 450 p. s. i. g. for a suitable reaction time. The advantages and importance of reducing the hold-up time between these operations and in minimizing back-mixing is described in more detail in Nicolaisen application, Serial No. 218,212, filed March 29, 1951, now abandoned.

Accurate control of the temperature of the mixture of aqueous chloroamine solution, gaseous ammonia and liquid ammonia is critical, it being important to avoid overheating the mixture locally, even for a short period of time, since decomposition of the hydrazine product will occur if this is done. Felger application, Serial No. 374,913, filed of even date herewith, discloses a Venturi mixing means for mixing cold aqueous chloroamine solution, gaseous ammonia and liquid ammonia rapidly and without exceeding any set maximum temperature by the use of suitable proportions of gaseous ammonia and liquid ammonia. Control of the ratio of the gaseous ammonia and liquid ammonia in accordance with our invention makes it possible to produce a mixture having substantially the preferred temperature.

The system of our invention also provides means for utilizing liquid ammonia in proportions suitable for admixture with the aqueous chloroamine solution and also for providing the desired excess of ammonia. In addition, the system of our invention provides for the evaporation of a suitable proportion of the liquid ammonia supplied to the system and the introduction of both gaseous ammonia and liquid ammonia to the mixer.

The system of our invention is an arrangement of apparatus which includes an ammonia charge tank having a suitable line connected thereto for the introduction of liquid ammonia, an ammonia vaporizing tank provided with a source of heat, and a mixer, preferably that disclosed in the aforementioned Felger application. Both tanks are positioned at substantially the same elevation and suitable lines for the transfer of gaseous ammonia and liquid ammonia to the mixer are provided. Liquid level control means operate to maintain a liquid level of ammonia in the ammonia charge tank by adjustment of the rate of flow of ammonia from that tank, and temperature control means are associated with the outlet line of the mixer whereby the amount of heat introduced into the ammonia vaporizing tank is suitably adjusted.

The system of our invention and its mode of operation can be made thoroughly understood by reference to the accompanying drawing, which is a diagrammatic view partly in section of the reactor system.

Aqueous chloroamine solution is introduced to Venturi mixer 11 by line 12 and liquid ammonia at ordinary temperatures is introduced by means of line 13 into ammonia charge tank 14. The latter is connected to vaporizer tank 15 by lines 16 and 17 which permit the flow of liquid ammonia between the vaporizer and charge tank and by line 18 which permits gaseous ammonia to pass from one tank to the other. Heating means 19 are provided for vaporizer 15. As shown, this is a steam coil which is fed by the steam through line 20 and which is provided with a line 21 for the removal of condensate. Charge tank 14 and vaporizer 15 are located at substantially the same elevation in order that aproximately the same ammonia liquid level can be maintained in both.

Gaseous ammonia is fed to the mixer 11 by line 22 and liquid ammonia is introduced into the mixer by line 23. The ratio of gaseous ammonia to liquid ammonia is controlled to maintain a constant temperature in the effluent from the mixer by temperature controller 24, which actuates valve 25 in line 20. Thus, a falling temperature of the mixture actuates the controller to increase the flow of steam to the vaporizer, and vice versa. Increased vaporization of ammonia in the vaporizer lowers the liquid level in both the vaporizer and the charge tank, thereby actuating liquid level controller 26 to close valve 27 in liquid ammonia line 23 to the mixer. In this way, a falling temperature in the mixer results in increased vaporization of ammonia and decreased introduction of liquid ammonia into the mixer, thereby raising the temperature of the effluent from the mixer. Conversely, a rising temperature in the effluent from the mixer results by similar means in decreased vaporization and increased introduction of liquid ammonia to the mixer.

As those skilled in the art will well understand, the particular type of level control 26 employed to actuate valve 27 is not critical, nor is the particular temperature control means 24 employed to actuate valve 25 critical. Also, as those skilled in the art will well understand, other conventional means besides the steam coil 19 can be used for the purpose of heating the ammonia present in the vaporizer 15.

We claim:

An apparatus suitable for use in the preparation of hydrazine by reacting an aqueous solution of chloroamine, liquid ammonia and gaseous ammonia including an ammonia vaporizing tank provided with a source of heat and an ammonia charge tank provided with a line for the supply of liquid ammonia, both tanks being at substantially the same elevation, both tanks being connected by a line entering the lower zone of each tank whereby a liquid level of ammonia in one tank will provide a liquid level of ammonia in the other tank and both tanks being connected by a line entering the upper zone of each tank whereby ammonia vapor above the liquid level of ammonia in one tank can flow to the other tank; a line connecting the upper zone of the ammonia supply tank and a line connecting the lower zone of the ammonia supply tank with a mixing device whereby gaseous ammonia and liquid ammonia can be supplied thereto, said mixing device also being provided with a line for the introduction thereto of an aqueous solution of chloroamine and with an outlet for the mixture produced therein; liquid level control means associated with the ammonia charge tank actuating a valve in the line between the ammonia supply tank and the mixer; and control means responsive to the temperature of the mixture produced associated with the heat source.

No references cited.